United States Patent [19]

Clatworthy et al.

[11] 4,173,413
[45] Nov. 6, 1979

[54] NAVIGATION INSTRUMENT

[76] Inventors: Gordon K. Clatworthy, Woodlands, Glanconway, Colwyn Bay, Clwyd, Wales; Edwin Ward, 4 Birch Way, Harpenden, Hertfordshire, England

[21] Appl. No.: 824,609

[22] Filed: Aug. 15, 1977

[51] Int. Cl.² .............................................. G01C 1/02
[52] U.S. Cl. ..................................... 356/145; 356/146
[58] Field of Search ............................... 356/144–146, 356/150, 255; 33/276–278, 280

[56] References Cited

U.S. PATENT DOCUMENTS

| 377,280 | 1/1888 | Townsend | 356/146 |
|---|---|---|---|
| 3,217,415 | 11/1965 | Madden | 356/146 |
| 3,694,095 | 9/1972 | Louthan | 356/255 |
| 3,758,212 | 9/1973 | Messler et al. | 356/145 |

FOREIGN PATENT DOCUMENTS

| 779494 | 4/1935 | France | 33/277 |
|---|---|---|---|
| 1291504 | 10/1972 | United Kingdom | 356/146 |

Primary Examiner—John K. Corbin
Assistant Examiner—Wm. H. Punter
Attorney, Agent, or Firm—Fleit & Jacobson

[57] ABSTRACT

An instrument for taking bearings of objects, particularly for use in coastal navigation, has a main body with one or two arms pivoted to the body. A first object is sighted through the main body, over the top of a plane mirror. Once a zero line of the main body is lined up on one object, the or one of the pivoted arms is swung out from the main body to point at a second object. The arm which is swung out is coupled to a second mirror arranged in the main body, so that as the arm is swung out, the second mirror rotates in the same direction and through half the angle that the arm turns through. Light rays from the second object are reflected from this second mirror to the first mirror in the main body, and then back to the eye of the observer. When the instrument is correctly adjusted, the observer will see the first object over the top of the first mirror and the second object in the first mirror, just below the first object. In this position, the angle between the main body and the arm that has been swung out is equal to the bearing between the two objects, and this bearing can be plotted directly on a chart, or made use of in other ways.

6 Claims, 17 Drawing Figures

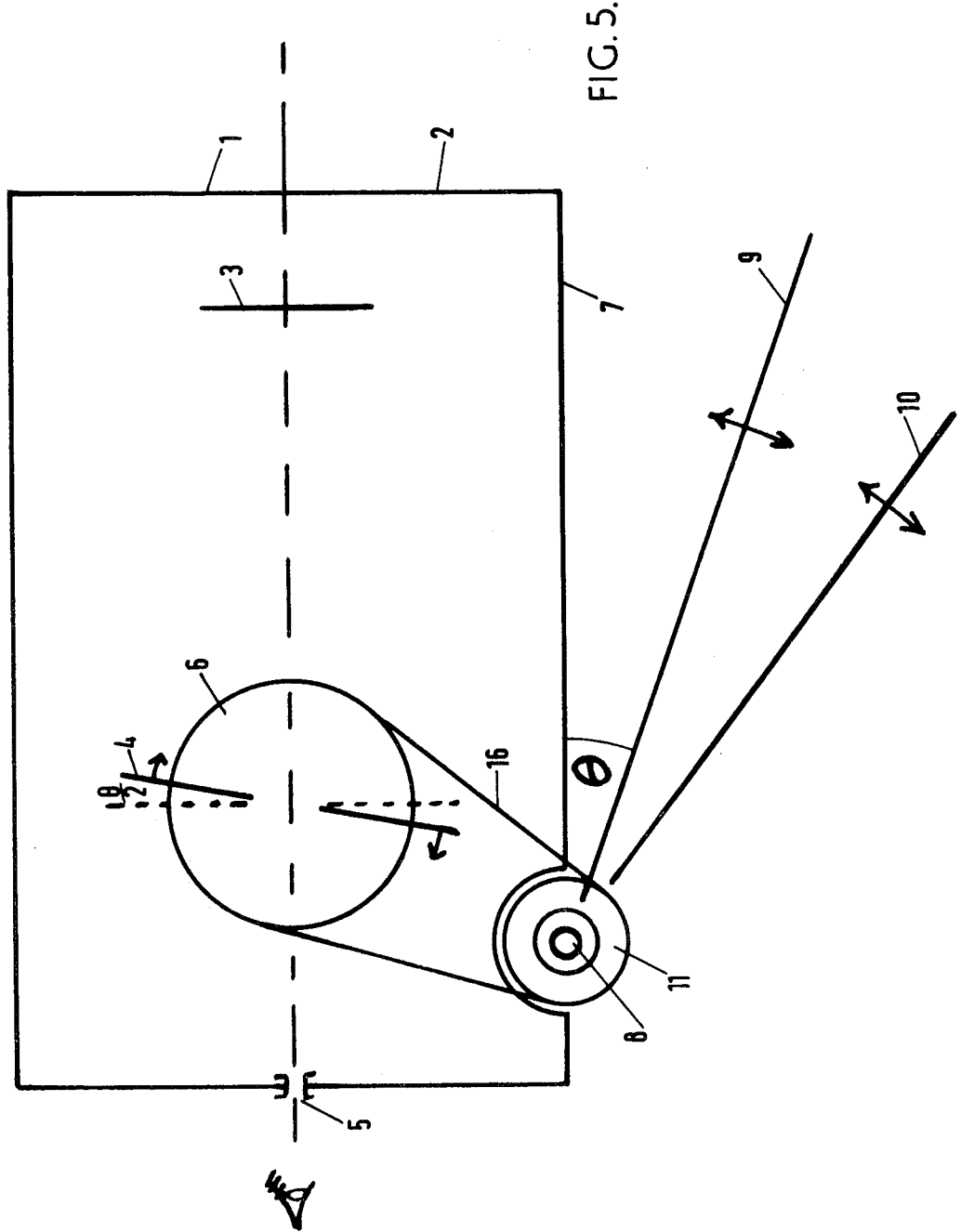

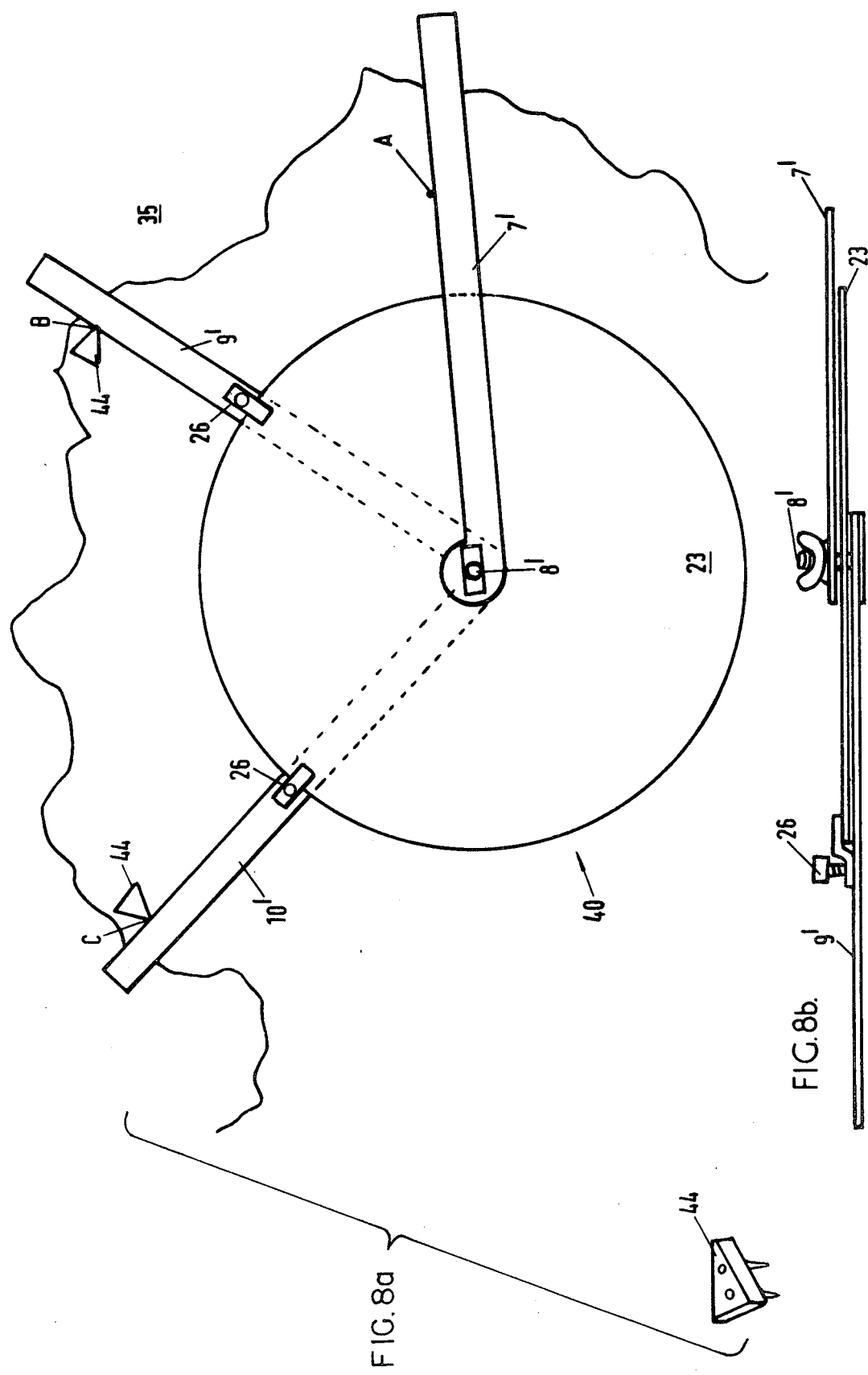

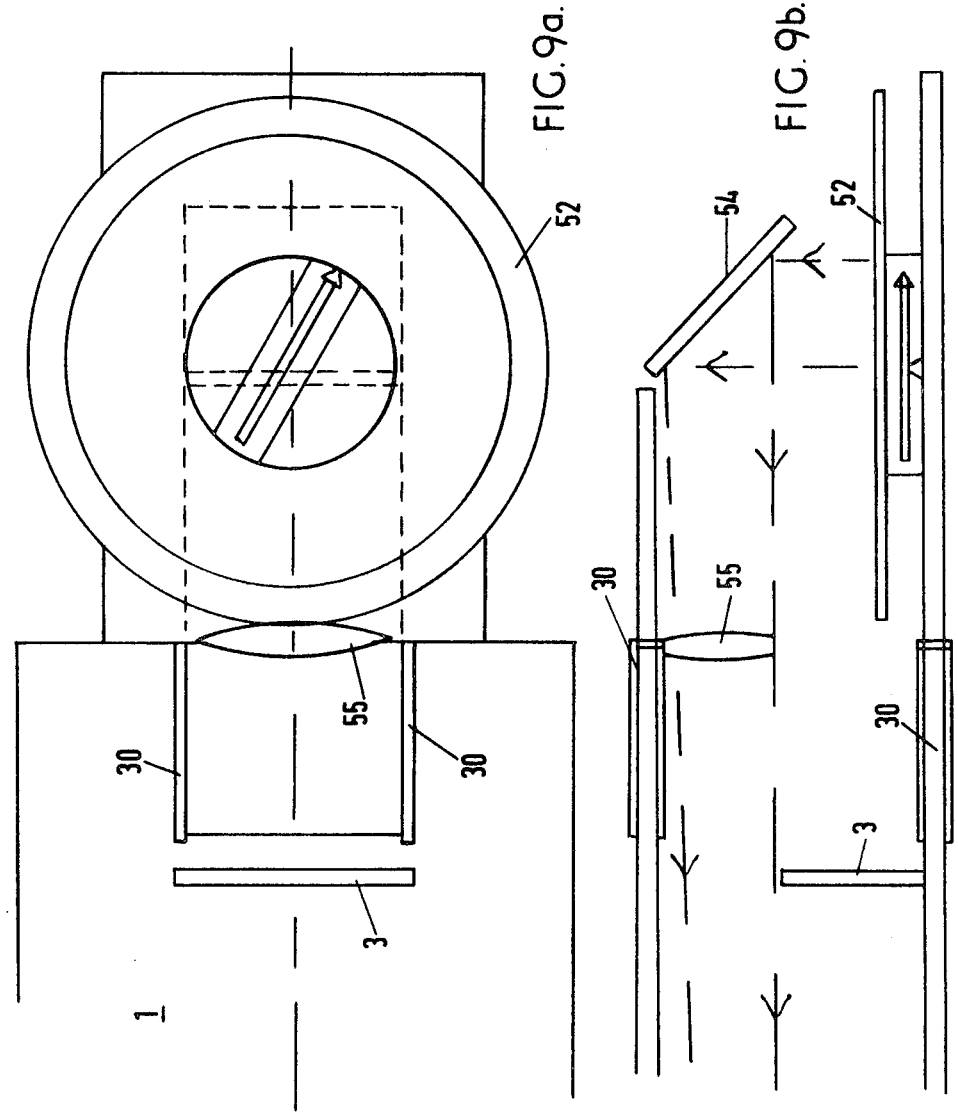

NAVIGATION INSTRUMENT

FIELD OF THE INVENTION

This invention relates to an instrument for taking bearings of objects in order to fix the position of the observer or of the objects. It is suitable for use in coastal navigation, in surveying and in other fields. The instrument can be used for taking bearings of objects in such a way as to enable angles or bearings taken to be accurately sighted when the instrument is hand held or situated on a "moving platform" and then transferred directly (without reading a protractor or other computation) to a chart, map, plan, elevation, or other scale representation, for example by drawing. This is achieved by a combination of direct sighting and simultaneous sighting via a system of double reflection with coincident images in such a way that the angle between two arms is identical to the angle actually observed.

BACKGROUND OF THE INVENTION

British Pat. No. 1,291,504 to Webster discloses an instrument in which first and second mirrors are used to produce an image of a second object which substantially coincides with an image of a first object viewed over the first mirror. However, this instrument is not easy to use, and is not very accurate. Although there is a zero line marked on the instrument, the observer has to move his head one side of the zero line to see an image of a second object, and the other side of the zero line to see an image of a third object. At the same time, the images will not be entirely coincident because of this small deflection of the returning rays from the centre line of the instrument.

SUMMARY OF THE INVENTION

It is an object of the invention to avoid the above mentioned disadvantages, and to produce an instrument which is accurate and easy to use.

It is also an object of the invention to produce an instrument which facilitates the reading off of results, or the transfer of the results to another form.

The invention accordingly provides an instrument for taking bearings between objects, comprising a body member, a first mirror mounted in the body member, eye piece means for viewing a first object through the body member over said first mirror, an arm member pivoted to the body member at a pivot axis, a second mirror mounted in the body member, a reduction drive connecting said arm member to said second mirror, so that as said arm member is turned, said second mirror is constrained to rotate in the same direction and through half the angle that said arm member turns through, the relative positions of said first and second mirrors being such that light rays reflected from the second mirror to the first mirror are reflected from the first mirror to the eye piece means.

The eye piece means may be a simple slit in one face of the body member, or may be a monocular telescope.

A second arm member may additionally be pivoted to the body member at said pivot axis.

In one embodiment, the second mirror is mounted off set from a line along which the first object is viewed, and the first mirror can be angled relative to said line to bring the image reflected from the second mirror to the first mirror and then from the first mirror to the eye piece means, into the correct position.

In a second embodiment, the second mirror is mounted on the line along which the first object is viewed, and has a non-reflecting central area through which the reflected image from the first mirror passes to the eye piece means.

With either of these embodiments, correct coincident images are presented to the observer's eye, so that an accurate bearing between two or more objects is produced.

Further features and advantages of the invention will become apparent from the following description.

BRIEF DESCRIPTION OF THE DRAWINGS.

FIG. 5 is a view, similar to FIG. 1, but showing a second embodiment of the invention.

FIGS. 9a and 9b are respectively plan and elevational views of a compass attachment for use with the instrument according to the invention.

DETAILED DESCRIPTION OF THE EMBODIMENTS.

Figure 1:
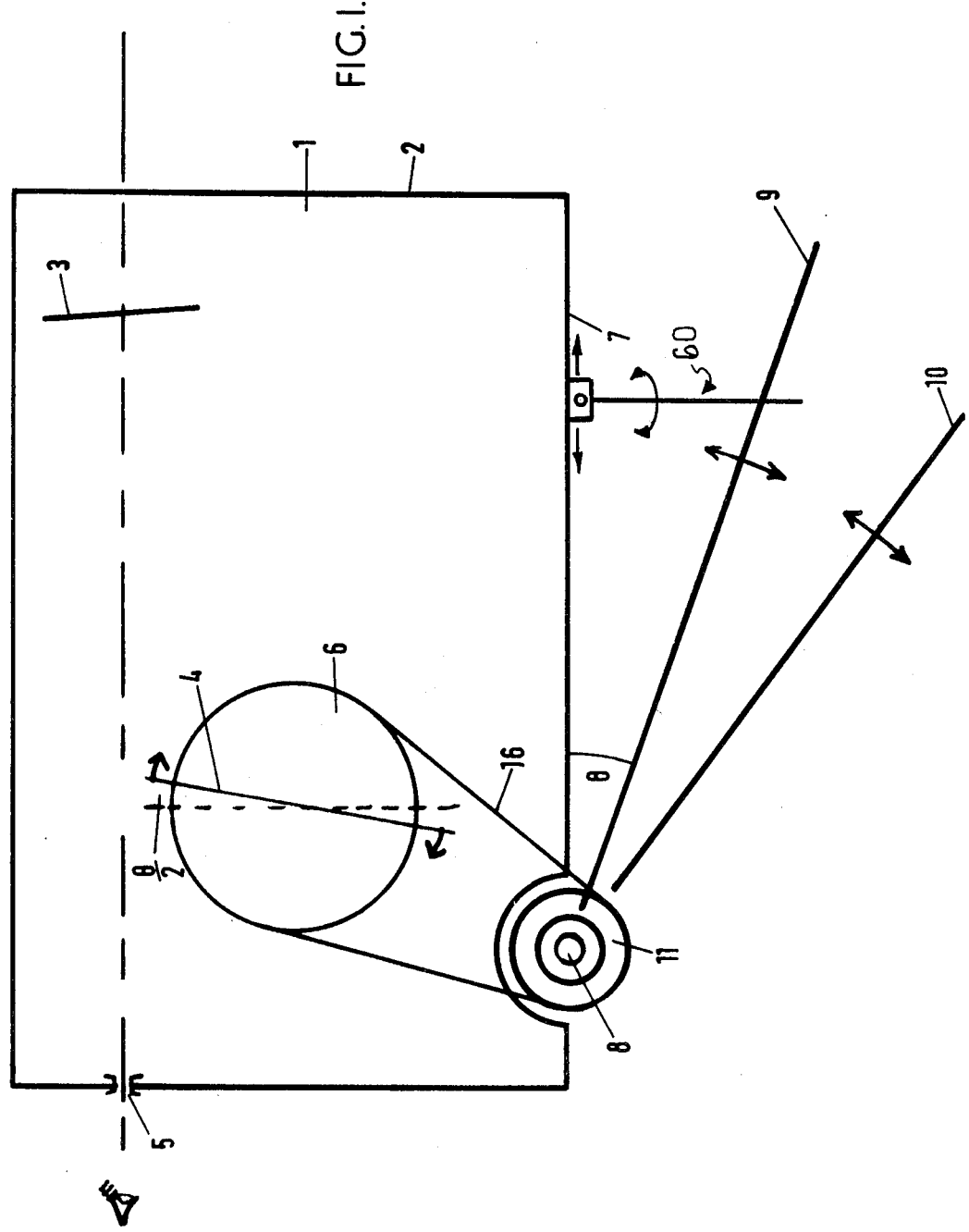
FIG. 1 is a schematic plan view of a first embodiment of an instrument according to the invention.

The instrument shown in FIG. 1 is in the form of a box 1 which is open at the end 2 to admit light. Inside the box, two mirrors 3, 4 are mounted. The first mirror 3 is mounted near the open end 2 of the box, on an imaginary line passing through a sighting aperture 5 at the opposite end of the box. A zero line, coinciding with the imaginary line, can be scribed on the base of the box 1. A monocular telescope may be mounted at the sighting aperture.

The second mirror 4 is mounted inside the box on top of a pulley wheel 6 which can be turned about its axis, taking the mirror with it. Both the first and second mirrors can be adjusted through small vertical and horizontal angles, relative to their mountings, in order to set up the machine to take readings, and are thereafter not adjusted during use. The second mirror 4 is however always turned when the wheel 6 turns.

The box 1 has a straight side edge 7, which is also open to admit light. This side edge 7 will be referred to in the following description as an arm member. Arranged on this arm member is an axle 8 on which two planar arms 9, 10 are pivoted. These arms can be folded flat against the arm member 7, or can be swung out into positions like those shown in FIG. 1. A second pulley wheel 11 is mounted on the axle 8 and fixed to one only of the arms, the arm 9, so as to be rotated when the arm 9 is swung out from the side 7 of the box.

Figure 4:
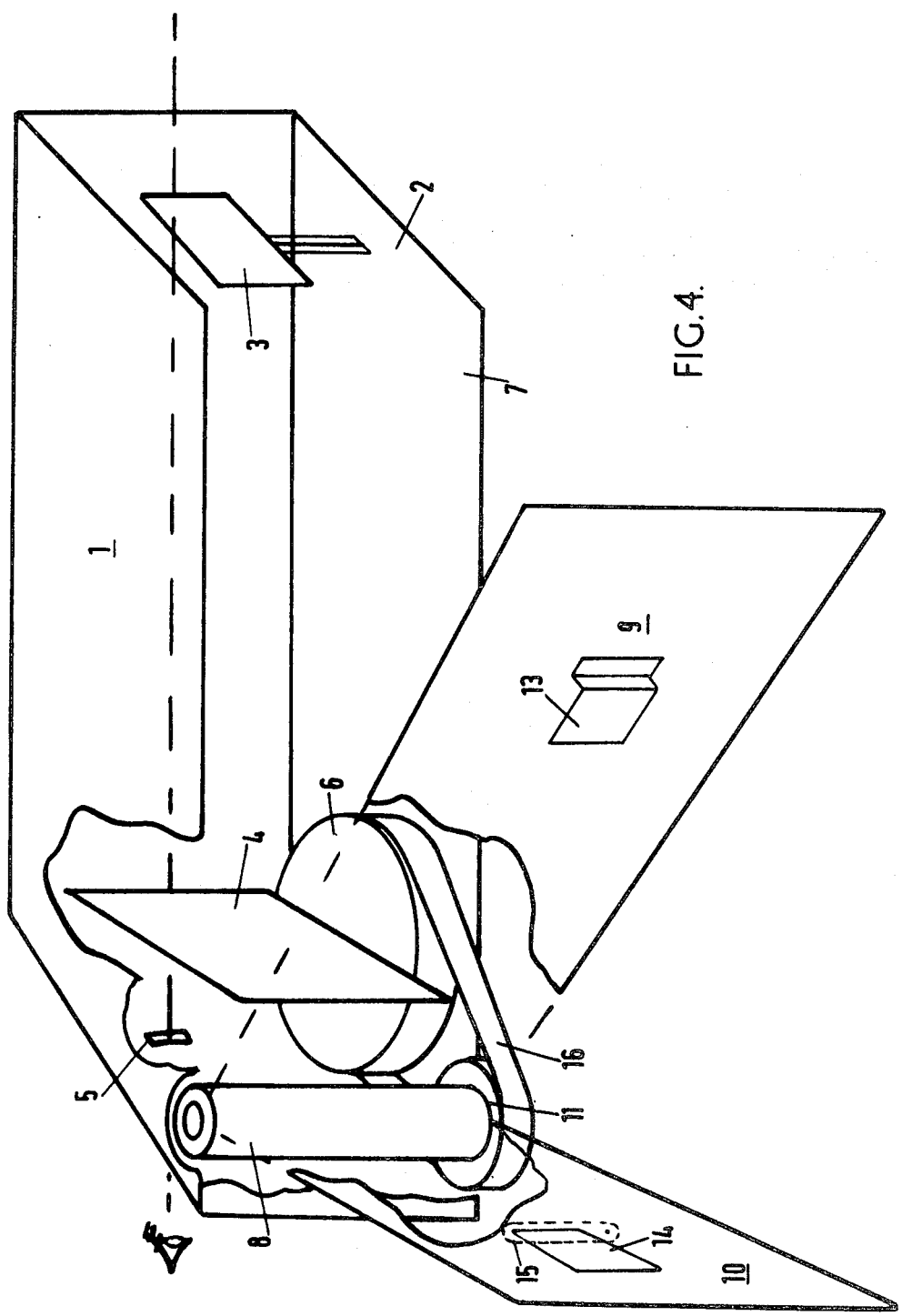
FIG. 4 is a cut-away view of the first embodiment, showing only the essential parts thereof.

Locks (not shown) are provided to lock each of the arms 9, 10 in any angular position. A device is also provided for holding the arms 9 and 10 together, and this device, as shown in FIG. 4, comprises a tongue 13 on the arm 9 which passes through a window 14 on the arm 10, and a latch 15 which can be swung to engage behind the tongue 13 on the far side of the window 14. With this arrangement, when the two arms are held together, the second mirror 4 will effectively follow the movements of the arm 10.

A belt 16 passes around pulley wheels 6 and 11, and because wheel 6 has a diameter exactly twice that of wheel 11, movement of arm 9 through an angle $\theta$ will cause wheel 6 and mirror 4 to be turned through an angle of $\theta/2$.

Figure 2:
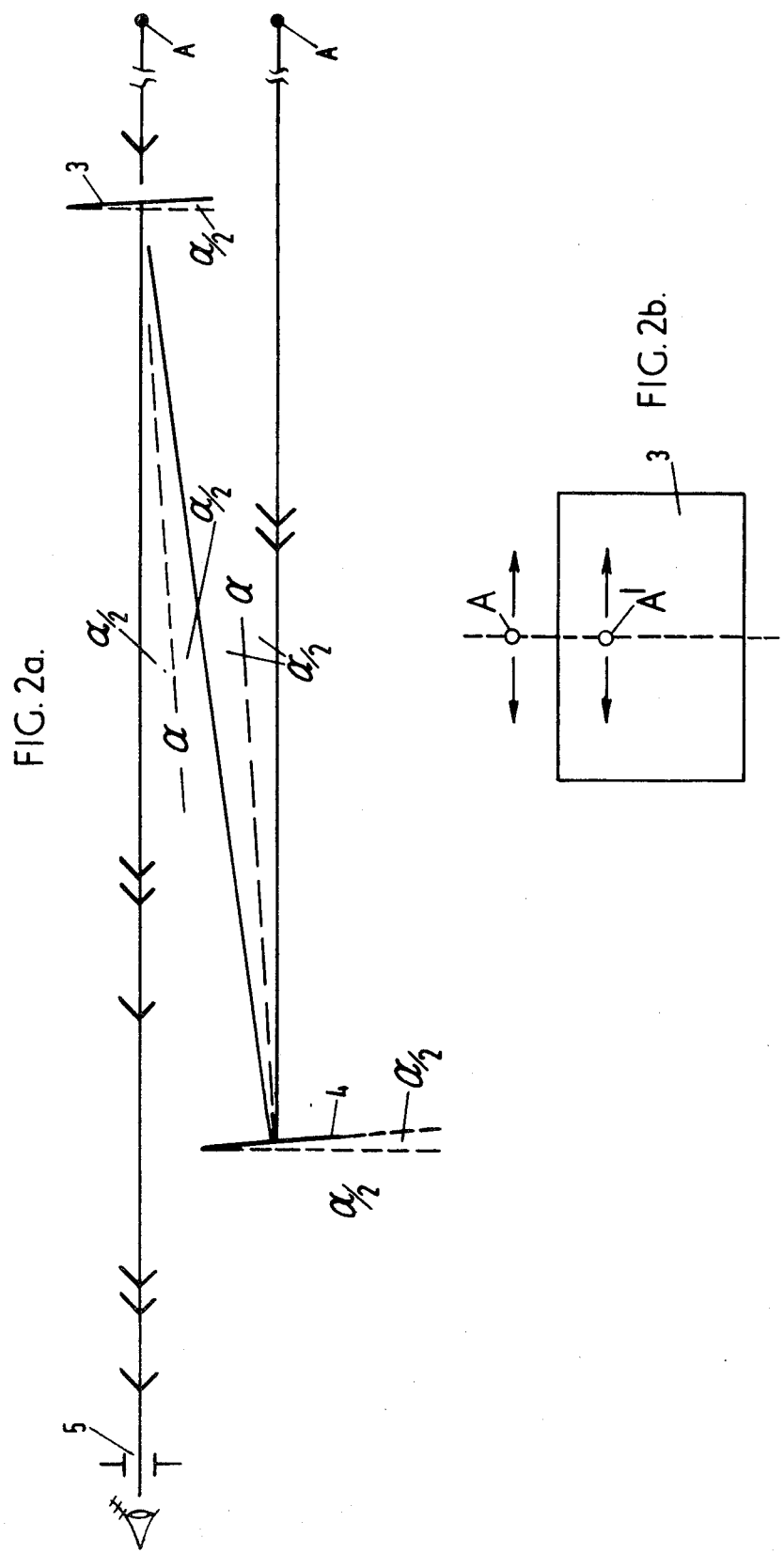
FIG. 2a is a ray diagram of the instrument of FIG. 1 when set up in the zero position.
FIG. 2b shows the image seen through the instrument of FIG. 2a, FIG. 3 is a ray diagram of the instrument of FIG. 1 when in use.
Figure 3:
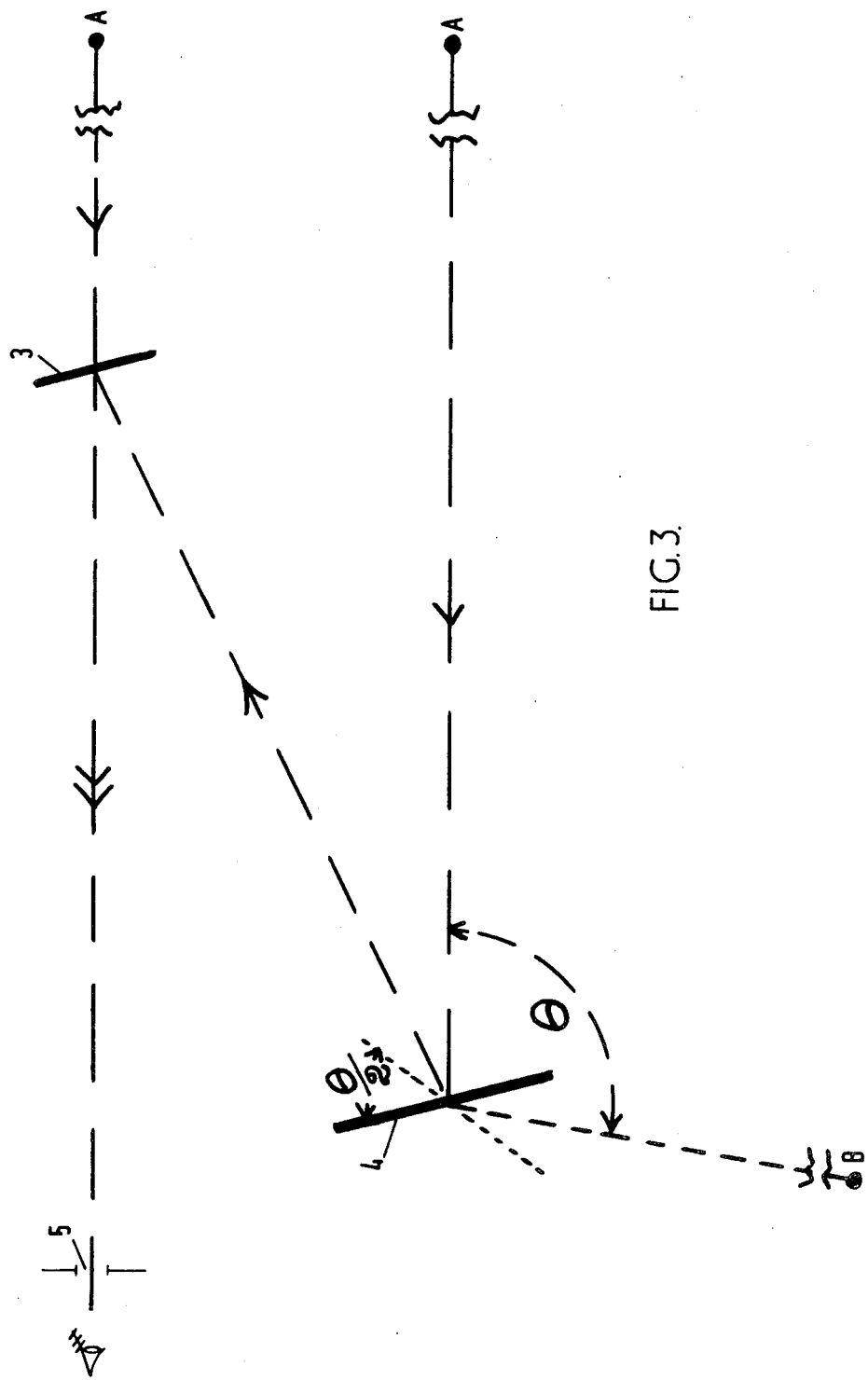

Operation of the instrument will be described in more detail with reference to FIGS. 2 and 3 which are plan views of the mirrors 3, 4 with relevant ray paths drawn in. The instrument is first directed towards a distant point A, from which parallel rays stem, in such a manner that the point itself can be directly viewed above mirror 3. Mirrors 3 and 4 are then adjusted for horizontal and vertical angles, i.e., through angles of $\alpha/2$, until the image of the point A is reflected from mirror 4 to mirror 3 and thence to the sighting aperture 5. The reflected image should appear directly below the point as viewed over the top of the mirror 3 and the images should not move apart if the whole instrument is swung slightly from one side to the other. (In other words, the images are coincident). The less the separation of the images A and A' (FIG. 2b), the greater the accuracy of the measurements. Thus, for greatest accuracy, the image A' in the mirror 3 must be as close as possible to the top edge of the mirror. In any case, the error introduced by a separation of the images will be very small.

To measure the angle between point A and a further point B (FIG. 3), the box is held so that A is still seen over mirror 3, and the arms 9 and 10 (which are at the moment locked together) are swung out from the side of the box so as to point in the direction of B. When the arms do point at B, they have turned through an angle of $\theta°$ and mirror 4 will have turned through $\theta/2°$, and an image of B will be reflected from mirror 4 to mirror 3, and thence to the sighting aperture 5 along the imaginary zero line. When the image of B in mirror 3 is directly under point A viewed directly, the angle between side 7 of box 1 and the parallel arms 9 and 10 corresponds exactly to the angle between points A and B.

A simultaneous bearing can be taken of a third point C (not shown), by locking arm 10 in the angular position where it points at B, releasing arm 9 from arm 10, and then swinging arm 9, until a reflected image of point C appears in mirror 3 directly under point A viewed directly. Arm 9 can then also be locked in position, and since the arms and the side 7 all have straight edges aligned with the axis of axle 8, the relative bearings can be easily transferred to a chart by simply laying the instrument on top.

The embodiment shown in FIG. 5 is a symmetrical arrangement of the same apparatus as is shown in FIG. 1. The second mirror 4 is mounted on the optical axis of the instrument which runs from the sighting aperture 5 through the first mirror 3. The pulley wheel 6 on which the second mirror 4 is rotatable is mounted so as to pivot on the optical axis of the instrument. A centre portion of the mirror 4 is clear or semi-silvered, so that mirror 3 can be viewed directly through the centre portion, while rays striking this mirror from the side of the first mirror 3 will be reflected.

Figure 6A:
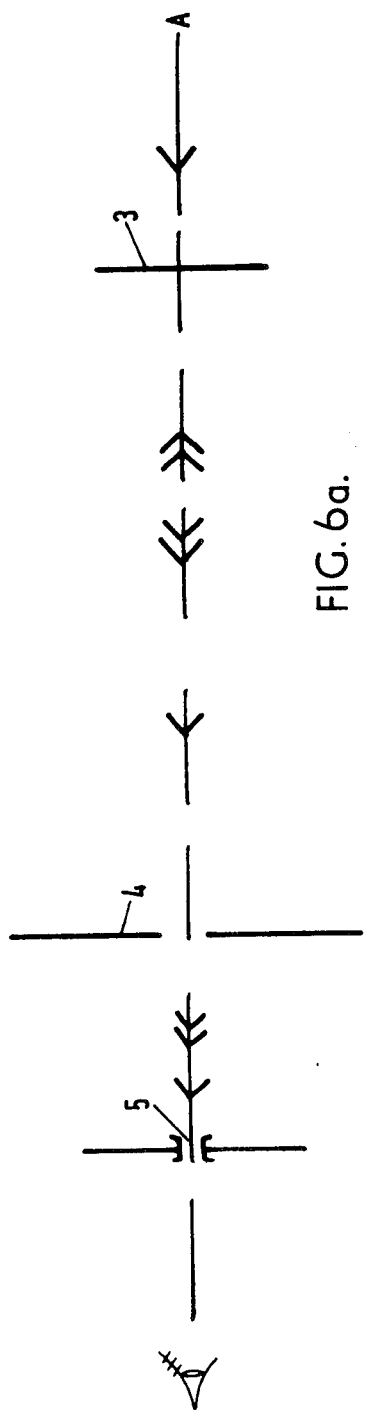
FIGS. 6a and 6b show the second embodiment of the instrument when set up in the zero position.
Figure 6B:
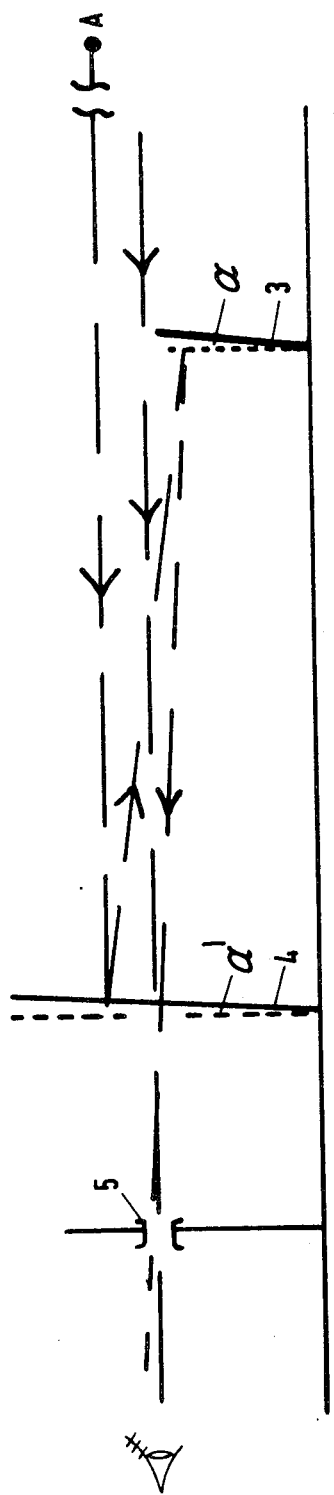
Figure 7A:
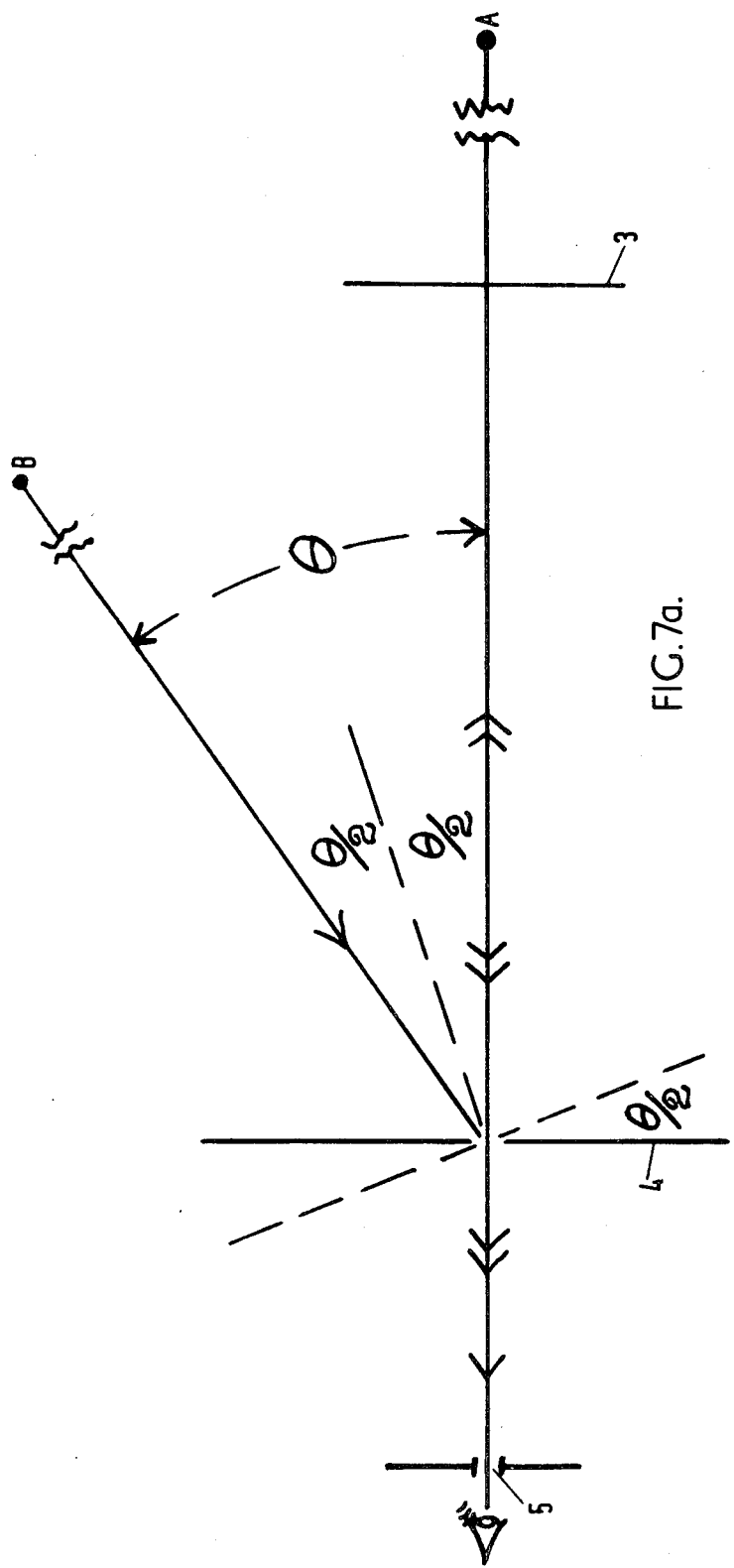
FIG. 7a is a ray diagram corresponding to that of FIG. 3, but showing a left-handed version of the second embodiment of the invention.
Figure 7B:
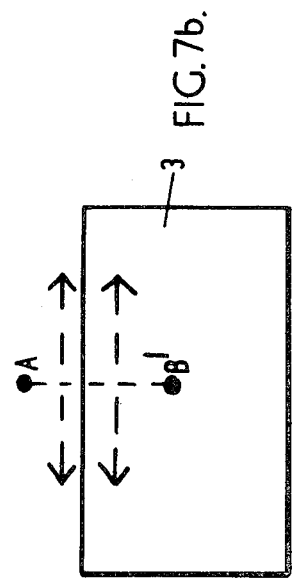
FIG. 7b shows the image seen through the instrument of FIG. 7a, FIGS. 8a and 8b are respectively plan and elevational views of a repeater for use with the instrument according to the invention.

FIGS. 6a and 6b show this symmetrical form of the instrument set up in the zero position. FIG. 6a is a plan view, where the single-headed arrows show the direct path of light from point A to the sighting aperture 5, and the double-headed arrows show the path of the reflected rays. FIG. 6b shows the same set-up in elevation view. From this view it can be seen how the mirrors 3 and 4 have to be tilted slightly from the vertical position in order to bring the reflected image into the right position. The vertical angles through which these mirrors are moved are denoted by $\alpha$ and $\alpha^1$ respectively.

This symmetrical arrangement is not preferred to the previously described asymmetric arrangement. The existence of the clear or semi-silvered central portion of the mirror 4 can give rise to secondary reflections which render the main reflection less clear.

To simplify the transfer of bearings from the instrument to a chart 35, as shown in FIG. 8a, pins can be stuck in the chart at two of the three points A, B, C, and the instrument then placed with the two appropriate arms in contact with these pins and slid around until the straight edge of the third arm coincides with the third point. The position of the axis of the axle 8 then corresponds to the position of the observer, and a hole can be provided through the axle 8 so that a pencil or other marking instrument can be inserted to mark the axis on the chart.

A protractor scale may be mounted on the top or bottom of the instrument and centered around the axle 8. This then enables bearings to be read off directly in degrees, and can serve a secondary purpose of providing a friction ring for slowing the swinging motion of the arms, and for providing a fixed member against which the arms can be locked. However, an alternative and preferred way of locking the arms is by having a clip or brake band around the axle 8 which can be tightened to grip the axle and to hold the arm in place.

Location guides 30, as shown in FIGS. 9a and 9b, are provided to facilitate the attachment of accessories to the top and bottom plates of the box 1. Such accessories can be mounted by sliding mortise-type attachments into the guides 30 so that they lie flush with the top and bottom plates.

FIGS. 8a and 8b show a left-handed repeater or recorder 40 for use with the instrument. The purpose of the repeater is to allow bearings taken with the instrument to be transferred, e.g., onto a chart, when it is undesirable for the complete instrument to be removed to the chart table. Repeaters may have either two or three arms. One with three arms is illustrated.

Parts of the repeater which correspond to parts of the instrument will carry the same reference number with the addition of a'.

The repeater has three arms 7', 9' and 10'. Arms 9' and 10' are pivoted to 7' at an axis 8'. A combined protractor and locking ring plate 23 enables the arms to be locked in position or to be set at predetermined angles. The arms of the repeater pivot on the axle 8' which is hollow (of the same internal diameter as the axle 8) and can be "plugged" into axis 8 on the instrument. The repeater also has a clamp which enables it to be attached firmly to the top or bottom plate of the instrument.

Clamps 26 can be screwed down to lock the individual arms in place against the locking ring plate 23.

It has been found convenient to use pins 44 with triangular shaped heads in the above method, with more than one point under each head to prevent the pin rotating. The pin is stuck in or on so that one vertex is at the particular point of which bearings were taken.

The mirror 3 may be marked with a vertical zero line on the optical axis of the instrument. This optical axis passes through the centre of the sighting aperture 5, and through the zero line on the first mirror 3, and runs parallel to the straight side edge 7. The mirror zero line should be "infinity" focused. This can be done by laying a flattened glass rod over the marked line, or by other known methods. Correct compass bearings, artificial horizon or lubber line or near (not distant) reference points bearings are taken with reference to this zero line.

FIGS. 9a and b show plan and elevation of a compass accessory which can be attached to the instrument. The compass 52 is of the face reading type, and is situated on the zero line of the instrument. A mirror 54 and a lens 55 form part of the accessory and enable the compass needle to be viewed over the top of mirror 3. The lens focusses the grid and needle of the compass at infinity for ease of reference against a distant object. If the instrument is now turned as a whole so that the zero line of the instrument coincides with a Cardinal Point of the compass, and movable arm 10 is then moved to a distant object C, the image of C appears in mirror 54 and can be aligned on the zero line in the mirror. After locking the arm 10 in that position, the bearing angle can be transferred directly to a chart (after the usual compass corrections have been allowed for). The same proceeding can of course be followed for a second distant object making use of arm 9. The instrument together with the compass can be used as an ordinary bearing compass.

If an artificial horizon is needed as reference, one or more spirit levels can be mounted inside the box. These can be mounted in such a way that they are visible to the observer as he takes a bearing, either by being positioned at the foot of the first mirror 3, or by being associated with mirrors which reflect the image of the spirit level to the sighting aperture 5. The levels are of a type which read either normally or inverted (to give a check on accuracy of level and to measure depressions as well as altitudes). The level uses a liquid of higher viscosity than is normal, and the level position is indicated only by the air bubble remaining still. It is not necessary for the bubble to lie at a particular position in the tube, as is usual. This facility is important when readings are to be taken from a moving deck, because a normal spirit level will not settle sufficiently quickly. The artificial horizon indicated by the spirit level must be referred to the zero line across the mirror 5, when this is present.

Figure 10:
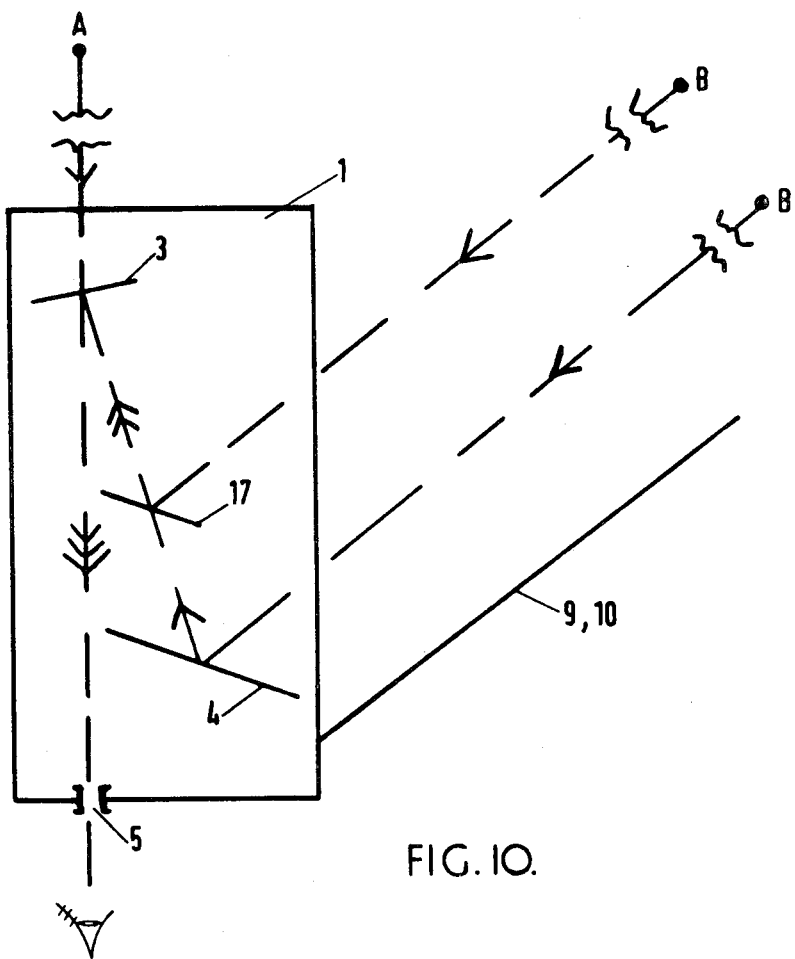
FIG. 10 is a schematic plan view of a modification of the embodiment of FIG. 1, FIGS. 11a and 11b illustrate a further optional feature of the invention.

FIG. 10 is a plan view of the instrument with the addition of a further facility for recording bearings taken, which is in the form of a third mirror 17. This third mirror has dimensions smaller than those of both the first and second mirrors, and is arranged to be pivotable over a range similar to that of the second mirror 4. A clamping device is provided to clamp this third mirror in any position, once it has been set.

To memorise a particular reading, the following procedure is followed. The arms 9, 10 are swung out from the box 1 until they are pointing at point B, and an image of point B is seen in mirror 3 reflected from mirror 4, and coinciding with point A viewed directly over the top of mirror 3. The mirror 17 is then pivoted by hand until it also reflects the image of point B to mirror 3. At this stage, the following images will be seen on looking through the sliding aperture 5: Point A viewed directly over the top of mirror 3; Point B reflected from mirror 4; Point B reflected from mirror 17. Mirror 17 is then clamped into position, and the bearing of point B is thus "memorized" by the instrument, and the arms 9, 10 can be moved to other positions. When it is desired to return to the bearing of point B, it is simply necessary to move the arms 9, 10, and thus the mirror 4, until the image reflected by mirror 4 is the same as that reflected by mirror 17. This image does not need to be the point B, but can be any image, provided that it is far enough away for the light rays from it to be considered as parallel. The position of arms 9, 10 then corresponds to the bearing of B from A.

Figures 11A, 11B:
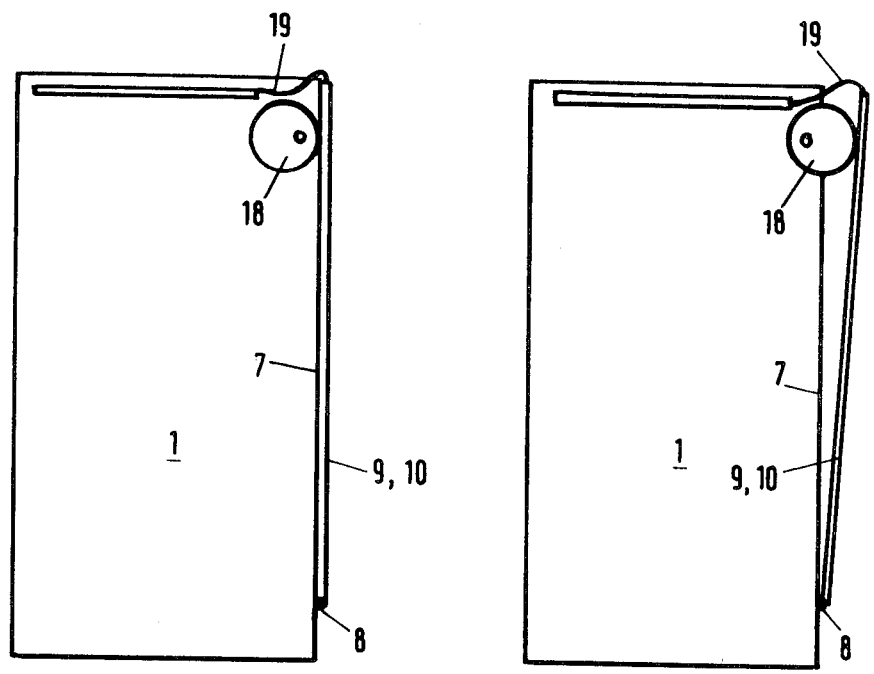

FIGS. 11a and 11b show a device developed for moving the arms 9, 10 through very small angles close to the side 7 of the box. The device could consist of an eccentric disc 18, and a spring 19 connecting the end of the arm 9, 10 to the body of the box 1. Rotation of the eccentric disc 18 causes the arms to be pushed out a small distance from the side of the box, against the pressure of the spring 19 which holds the arms against the surface of the eccentric disc. This device is only suitable for use in turning the arms through small angles near to the zero position of the instrument.

These small angles may be read off in degrees or part thereof, or may be used in conjunction with a conversion factor to measure or read off distances between objects, or between the observer and an object by the application of known tacheometric or stadiometric techniques. Similarly, such small angles may be measured "on the beam," i.e., at right angles to the side 7 of the box.

The use of a slow motion mechanism for adjusting the arms through very small angles can be applied in all positions of the arms 9, 10, although this is only shown close to the zero position.

It should be emphasised that with this instrument it is not necessary to take any compass bearings or to read off any degree scales in order to obtain a fix.

The instrument can be produced in both left-handed and right-handed versions.

It would also be possible to reverse the sequence of use—i.e., to align the arms relative to points on the chart and then to pick up the positions of distant objects.

In use, the instrument will be held in one hand (normally the left hand with a right-handed version) with the sighting aperture eye piece against the eye socket of the observer. The arm members 9 and 10 can then be angled using the right hand. The instrument can be held either horizontally or vertically, as desired, or alternatively inverted to suit the observer and the orientation of the instrument when in use.

The instrument can be used for taking bearings to the left or to the right or for elevations or depressions of either terrestrial or celestial objects by suitable orientation of the plane of rotation of the arm members 7, 9 and 10. This plane can be either vertical, horizontal or inverted.

If the instrument is turned so that the plane of rotation is vertical, altitude and depression bearings may be taken with equal facility, enabling height-distance ratios or horizon-sun or other celestial body altitudes to be obtained. No zero reference line is needed for this.

Although the described embodiment has three arm members, it is envisaged that an embodiment with only two arm members, i.e., with only one plane arm member 9 pivoted on the axle 8, could be of use in certain circumstances, e.g., for teaching purposes.

An additional fitting which can be provided is a side-arm 60 which in use extends from the straight edge of the box to cross that of an arm 9, 10 or extends from the straight edge of an arm 9, 10 to cross that of the box. It can be slid backwards and forwards along the straight edge to which it is applied. It can be set at any angle to the straight edge and locked in position by means of a lock nut. It can thus provide the third side of triangles of which the straight edges of the box and an arm 9, 10 provide the other two sides. Such triangles may be used to reproduce mensuration or vector triangles to scale and graphical solutions to problems read off or plotted. The side-arm when mounted on an arm 9, 10 can also be used to provide a straight edge parallel with the straight edge of the box and be used in conjunction with arms 9, 10 to solve graphically problems encountered in doubling (halving) the angle on the bow (stern) and similar constructions.

We claim:

1. An instrument for taking bearings between objects and plotting them, comprising:
  a body member having a straight edge,
  a first mirror mounted in the body member,
  eyepiece means for viewing a first object through the body member over said first mirror, said first mirror being mounted at an angle to a line along which said first object is viewed,
  an arm member, having a straight edge, pivoted to the body member at a pivot axis, wherein said respective straight edges of said body member and arm member intersect at said pivot axis, and wherein said straight edges extend substantially the entire length of said instrument,
  a further, passive arm member having a straight edge intersecting the pivot axis pivoted on the pivot axis to the body member, on the same side of the body member as said first-mentioned arm member, means for locking together the two arm members, and means for locking each of the arm members relative to the body member,
  a second mirror mounted in the body member,
  a reduction drive connecting said arm member to said second mirror, so that as said arm member is turned, said second mirror is constrained to rotate in the same direction and through half the angle that said arm member turns through,
  the angle of said first mirror to said line being such that light rays reflected from the second mirror to the first mirror are reflected from the first mirror to the eyepiece means along said line, to achieve a condition of coincident images.

2. An instrument as claimed in claim 1, further comprising a plurality of additional straight edge members, and means for aligning said additional straight edge members coextensive with said respective straight edges of said body member, arm member and passive arm member.

3. An instrument as claimed in claim 1, wherein accessory mounting means are provided on the instrument at positions spaced from the pivot axis for mounting accessories used in conjunction with the straight edges.

4. An instrument as claimed in claim 3, wherein a zero line is provided on the body member extending from the eyepiece means to the first mirror and parallel to said straight edge of the body member.

5. An instrument as claimed in claim 1, and including a third mirror mounted in the body member on the same side of the line along which said first object is viewed as the pivot axis, said third mirror facing the first mirror and being independently pivotable through a range comparable with that of the second mirror.

6. An instrument as claimed in claim 1, further comprising a side-arm member, and means for mounting said side-arm member on the instrument.

* * * * *